(12) United States Patent
Hinnant et al.

(10) Patent No.: US 8,838,298 B2
(45) Date of Patent: Sep. 16, 2014

(54) METHODS AND SYSTEMS FOR ACTIVE WING AND LIFT SURFACE CONTROL USING INTEGRATED AEROELASTICITY MEASUREMENTS

(75) Inventors: Harris O. Hinnant, Seattle, WA (US); David J. Black, Renton, WA (US); Darin W. Brekke, Fox Island, WA (US); Mark A. Castelluccio, Kent, WA (US); Matt R. Dickerson, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 1290 days.

(21) Appl. No.: 12/238,049

(22) Filed: Sep. 25, 2008

(65) Prior Publication Data

US 2010/0076624 A1 Mar. 25, 2010

(51) Int. Cl.
| | | |
|---|---|---|
| *G05D 1/00* | (2006.01) | |
| *G05D 1/08* | (2006.01) | |
| *G05D 3/00* | (2006.01) | |
| *G06F 7/00* | (2006.01) | |
| *G06F 17/00* | (2006.01) | |
| *G05D 1/06* | (2006.01) | |
| *G01M 5/00* | (2006.01) | |
| *G01C 21/16* | (2006.01) | |

(52) U.S. Cl.
CPC ........... *G01C 21/165* (2013.01); *G01M 5/0016* (2013.01); *G01M 5/0041* (2013.01)
USPC ..................................... 701/4; 701/6; 701/10

(58) Field of Classification Search
USPC ............ 701/4, 6, 10; 244/198, 214, 215, 217, 244/203, 219, 218, 75.1, 76 R, 76 A, 99.11, 244/99.14, 99.8
See application file for complete search history.

(56) References Cited

U.S. PATENT DOCUMENTS

| | | | | |
|---|---|---|---|---|
| 2,938,680 A | * | 5/1960 | Greene et al. ................. | 244/214 |
| 3,561,702 A | | 2/1971 | Jones | |
| 4,330,100 A | * | 5/1982 | Elber .............................. | 244/48 |
| 4,351,502 A | * | 9/1982 | Statkus ......................... | 244/219 |
| 4,455,004 A | * | 6/1984 | Whitaker, Sr. .............. | 244/90 R |
| 5,082,207 A | * | 1/1992 | Tulinius ...................... | 244/76 R |
| 5,681,014 A | * | 10/1997 | Palmer ......................... | 244/219 |
| 5,887,828 A | * | 3/1999 | Appa ............................ | 244/215 |
| 5,921,506 A | * | 7/1999 | Appa ............................ | 244/219 |

(Continued)

OTHER PUBLICATIONS

Sinpyo hong, Man Hyung Lee, Jose A. Rios, Jason L. Speyer, "Observability Analysis of INS with a GPS Multi-Antenna System", Aug. 9, 2002, KSME International Journal, vol. 16 No. 11, pp. 1367-1378, 2002.*

*Primary Examiner* — Bhavesh V Amin
*Assistant Examiner* — Nicholas Kiswanto
(74) *Attorney, Agent, or Firm* — Armstrong Teasdale LLP

(57) ABSTRACT

An active wing and lift surface control system for an aircraft is described. The wing and lift surface control system includes an aeroelasticity measurement system configured to provide at least one of real time wing twist measurements and real time measurements of aircraft body bending, at least one actuator mechanically coupled to a control surface of the aircraft, and a control system communicatively coupled to the aeroelasticity measurement system and to the at least one actuator. The control system is operable to receive the measurements from the aeroelasticity measurement system and generate control signals, based on the real time measurements, to operate the at least one actuator to adjust a drag associated with one or more of the wing and the aircraft body.

21 Claims, 3 Drawing Sheets

(56) References Cited

U.S. PATENT DOCUMENTS

| | | |
|---|---|---|
| 6,375,127 B1* | 4/2002 | Appa .......................... 244/215 |
| 6,641,089 B2 | 11/2003 | Schwetzler et al. |
| 6,766,981 B2 | 7/2004 | Volk |
| 6,970,773 B2 | 11/2005 | Phillips |
| 7,004,428 B2 | 2/2006 | Tracy et al. |
| 7,307,585 B2 | 12/2007 | Hinnant, Jr. et al. |
| 2003/0102411 A1* | 6/2003 | Kota ............................ 244/219 |
| 2004/0079835 A1* | 4/2004 | Volk ............................ 244/76 C |
| 2004/0243360 A1* | 12/2004 | Niedermeier et al. ............ 703/1 |
| 2005/0022619 A1 | 2/2005 | Clingman et al. |
| 2005/0151029 A1* | 7/2005 | Tracy et al. ..................... 244/215 |
| 2007/0096979 A1* | 5/2007 | Hinnant et al. .......... 342/357.06 |
| 2008/0035798 A1* | 2/2008 | Kothera et al. ................ 244/212 |
| 2009/0324093 A1* | 12/2009 | Miarecki et al. .............. 382/203 |

* cited by examiner

METHODS AND SYSTEMS FOR ACTIVE WING AND LIFT SURFACE CONTROL USING INTEGRATED AEROELASTICITY MEASUREMENTS

BACKGROUND

The field of the disclosure relates generally to aircraft wing and lift surface control, and more specifically, to methods and systems for active lift surface control using integrated aeroelasticity measurements.

Expectations are that future aircraft designs will face increasing pressure to improve fuel efficiency and performance. One effective fuel efficiency technique is accomplished through measurement of wing twist for various phases of an aircraft flight. Specifically, wing twist is measured, and the data used to produce a reduction in drag through design of a more efficient wing.

To that end, integrated systems for measuring wing twist have been developed for flight test purposes and are referred to herein as integrated aeroelasticity measurement systems. Current practice employs the integrated aeroelasticity measurement system in flight testing, using it to measure actual twist and bending of the airframe for selected flight conditions (aircraft speed, altitude, and fuel load and the like) and measurement points on the wing or body. The data is later used to remove uncertainty in the lift/drag ratio computation, leading to an improved wing design and better understanding of actual performance (meaning more confidence in performance guarantees to the customer). After the flight test data is generated, the integrated aeroelasticity measurement system is removed from the aircraft.

Use of control surfaces to adjust wing twist has been demonstrated in flight test, and those skilled in the art will recognize that wing twist varies as a function of altitude, weight, mach and like factors with a direct impact on the lift/drag ratio of aircraft performance.

There have been experimental aircraft and military aircraft that allow active wing control, however, these applications do not utilize an integrated aeroelasticity measurement system. Generally, these active wing control systems were associated with flight stabilization of the vehicle through operation of the vehicle control system.

Existing solutions for improving aircraft performance rely largely on computer simulation and modeling of wing twist when designing a wing. Other data is provided through the collection of wing twist measurements and flight test data that is related to wing twist. These simulation, modeling, and testing solutions do result in an improved overall wing design. However, such improvements are limited, due to the fixed nature of flight testing and computer simulations. In one example, predicted tables (schedules) are based on weight, altitude, mach, and performance predictions at different loads. These tables are used to adjust flight control surfaces to lower wing drag by twisting the wing as needed. While the method provides a potential improvement, the improvements are limited due to a finite set of data points in the predicted tables, and by the limited effectiveness of using flight control surfaces to lower wing drag. That is, use of flight control surfaces to shape the wing for lower drag is limited because these shape changes also induce wake vortexes and changes to wing camber that tend, after a point, to cancel the improvements in drag.

BRIEF SUMMARY

In one aspect, an active wing and lift surface control system for an aircraft is provided. The active wing and lift surface control system includes an aeroelasticity measurement system configured to provide at least one of real time wing twist measurements and real time measurements of aircraft body bending, at least one actuator mechanically coupled to one or more of a control surface and a lift surface of the aircraft, and a control system communicatively coupled to the aeroelasticity measurement system and to the at least one actuator. The control system is operable to receive the measurements from the aeroelasticity measurement system and generate control signals, based on the real time measurements, to operate the at least one actuator to adjust a drag associated with one or more of the wing and the aircraft body.

In another aspect, a method for increasing aircraft performance is provided. The method includes receiving at least one of real-time wing twist measurements and real time measurements of aircraft body bending from an aeroelasticity measurement system, calculating at least one of a desired flight control surface position and a desired lift surface position based on the received measurements and current flight conditions, and operating a plurality of actuators mechanically coupled to the aircraft to achieve the at least one desired flight control surface position and desired lift surface position.

In still another aspect, a flight control system is provided that includes at least one actuator mechanically coupled to at least one of a wing or other lift surface of an aircraft, and a processor configured to receive the wing twist measurements from an external source such as an integrated aeroelasticity measurement system. The processor is programmed to generate control signals, based on the wing twist measurements, to operate the at least one actuator to adjust a drag associated with at least one of the wings and other lift surfaces of an aircraft.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
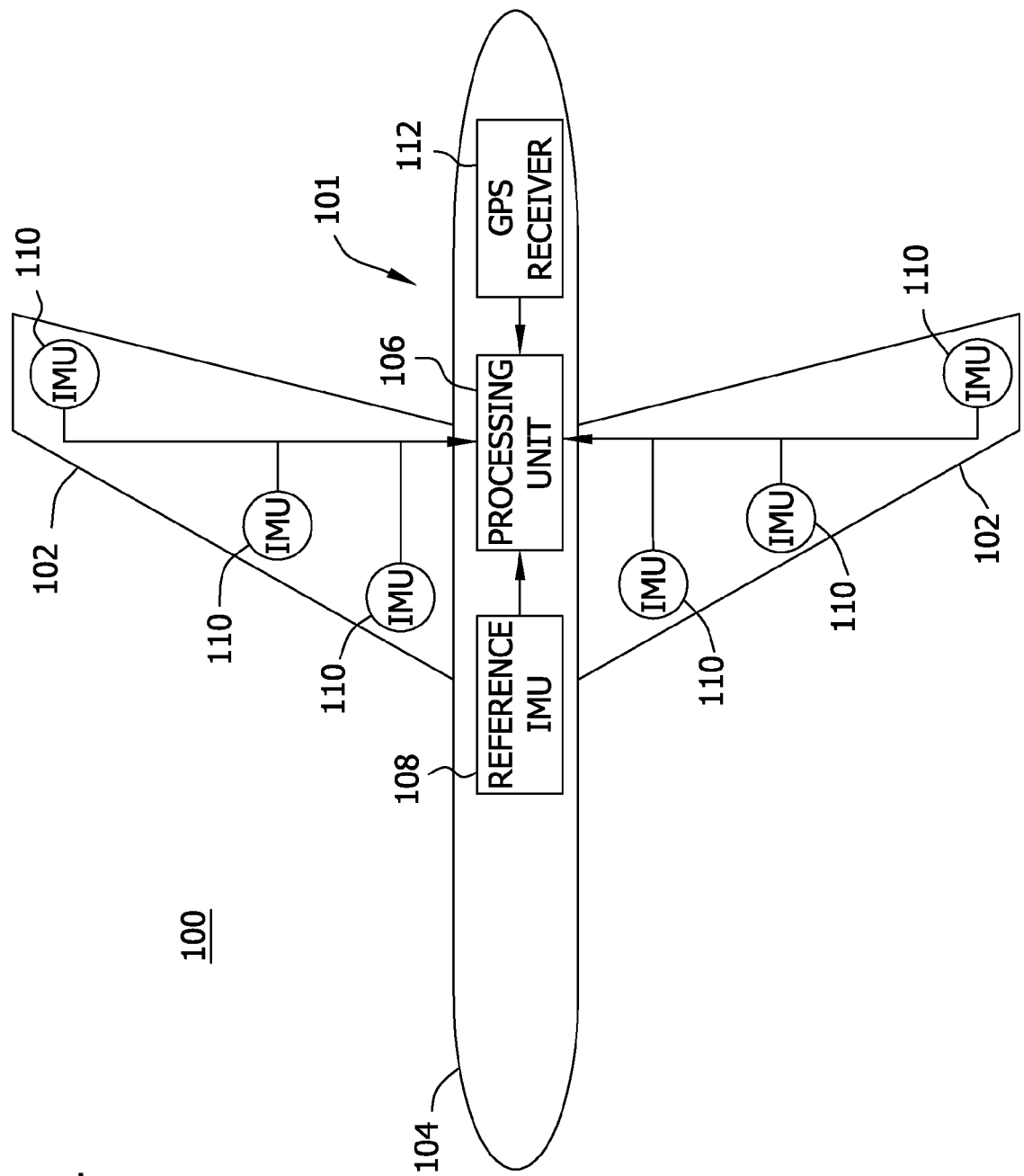
FIG. 1 is a schematic representation of an aircraft having an integrated system for measuring aeroelasticity of the aircraft wings deployed therein.

A typical aircraft has lift surfaces and control surfaces. The lift surfaces (wing, canard, fuselage and the like) provide lift as a function of engine thrust, while the control surfaces (ailerons, flaps, rudder and the like) may be moved by means of actuators to control the aircraft flight path, commonly called flight control. The description herein introduces the concept of actuators that may be used not for flight control in the traditional sense, but to achieve a lower drag by flexing lift surfaces, typically the wing, to a more desirable (e.g., fuel efficient) shape. Thus a distinction is made between flight control and lift surface control wherein existing flight control surfaces may be used to achieve a desired lift surface shape but also actuators in a lift surface designed for active shape control may be used to the same end. In practice existing flight control surfaces can be used to achieve control of lift surface shape (to twist a wing, for example) but this is less effective and more limited by comparison to use of wing twist actuators in a wing (for example) designed to be actively twisted to a desired shape.

Therefore in the discussion that follows we refer to lift surface actuators and lift surface control versus flight control actuators and flight control. It is possible to use flight control actuators (and surfaces) to achieve lift surface control (shape a wing, for example, to a lower drag position), but this is less effective than using a dedicated lift surface (wing twist actuator, for example) actuator specifically installed to twist the wing to a desired shape. The discussion describes obtaining real time twist measurements and using them in conjunction with the flight control system, not for the purpose of flight control in the traditional sense, but for controlling the shape of the wing to lower the drag, which is referred to as lift surface control. Lift surface control may be achieved with existing flight control actuators, but is more effectively implemented via dedicated lift surface actuators in a lift surface specifically designed for this type of active control.

The method and system described herein teaches the use of an integrated aeroelasticity measurement system to perform, in conjunction with the flight control system, active control of the lift surfaces for the purpose of obtaining a new level of aircraft performance not realizable with existing techniques. Furthermore, while existing control surfaces can be used, the method and system herein may additionally use a lift surface designed specifically for active control based on real time twist measurements. Thus the method herein describes a new aircraft subsystem for actively controlling lift surface shape based on real time measurements of twist and bending, where the lift surface may be a wing, canard, the aircraft body etc., and the change in shape is achieved using any available control surface of the aircraft, including a wing or other lift surface specifically designed for active control.

Therefore, described herein are systems and methods for performing active wing and lift surface control based on real time measurements of wing twist in flight. In one embodiment, an integrated system for measuring aeroelasticity of the wings in an operational flight form, such as an air vehicle, is utilized to provide a real time wing twist measurement that can be used in the active control of a wing configuration. Additionally, this integrated aeroelasticity measurement system may be utilized to measure body bending of an aircraft. More specifically, and as further described herein, a reduction in drag may be obtained using body bending data in addition to wing twist data, and any control or lift surface of the vehicle, for example winglets, horizontal stabilizers, and certain fuselage areas, may be employed by a control system to adjust the aircraft structure to a desired, lower drag, shape based on the real time measurements.

While the embodiments described herein are generally focused on wing twist measurement, the techniques described are applicable to measurements of body or other lift surface flexure in flight. Furthermore, while performance benefits usually arise as a result of lowering drag, in certain situations, such as landing, a performance benefit might be obtained by controlling twist to increase drag.

Depending on the twist value, the shape of the wing is such that drag is either increased or decreased and the goal of active wing control with real time twist measurements is to decrease the drag based on knowledge of designed-to aircraft performance at different flight conditions. Furthermore, real time information on body bending in conjunction with wing twist, and use of any available control surface, not just those on the wing, in addition to or in lieu of lift surface actuators, can be used to obtain like performance benefits.

Real time body bending data could be used as well, and any lift surface of the vehicle may be actively controlled to obtain a performance advantage. Such a system increases the performance (e.g., fuel efficiency) achievable by the air vehicle. As described herein, the integrated aeroelasticity measurement system provides data to a flight control system. Software associated with the flight control system receives the twist measurements and generates control signals for actuators. The actuators may be existing flight control surface actuators or actuators housed within a wing or other lift surface specifically designed for active control. The actuators are operable to adjust a wing configuration (in the case of the flight control surface actuators) and/or change an overall shape and/or orientation of a wing (in the case of the housed actuators) to counteract the deflection and twisting normally encountered during flight. Furthermore, these actuators may be existing in any control surface of the vehicle that may be used to advantage in obtaining a lower drag configuration.

Figure 2:
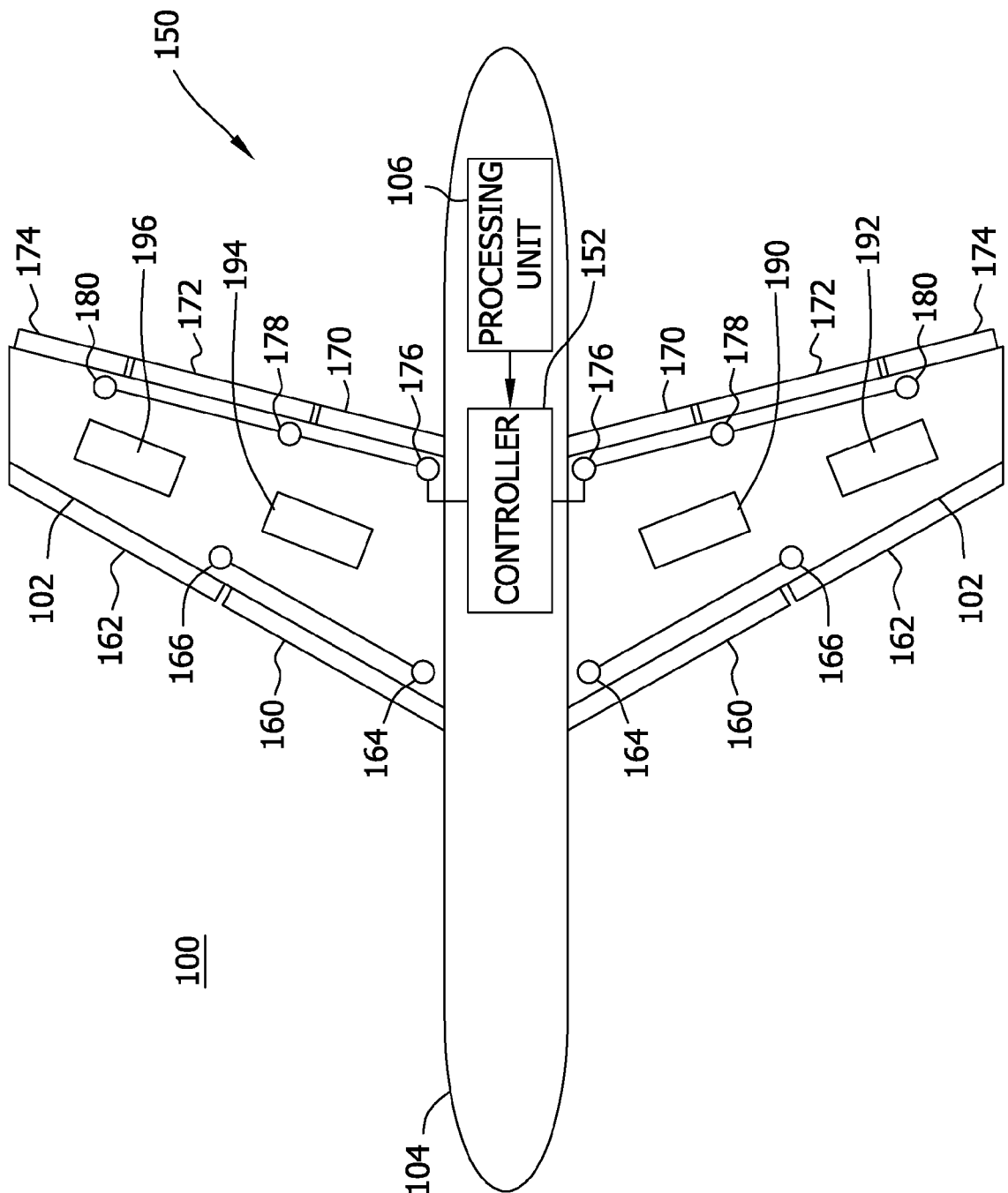
FIG. 2 is a representation of the aircraft of FIG. 1 illustrating a control system for active wing control.

FIG. 1 is a simplified schematic representation of an aircraft 100 having an integrated system 101 for measuring aeroelasticity of the aircraft wings 102, and FIG. 2 is a schematic representation of a flight control system 150 suitable for use with the aeroelasticity measurement system 101 described herein to control and operate one or more actuators to adjust and change a drag associated with the aircraft wing based on wing configuration and/or overall shape. The various illustrative blocks, modules, processing logic, and circuits described in connection with processing units of integrated system 101 and flight control system 150 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Referring to FIG. 1, aircraft 100 generally includes two wings 102 attached to a body 104. During flight, wings 102 may deflect and/or twist relative to their respective chord lines. The amount of deflection and twist may vary during flight depending upon various factors such as airspeed, weather conditions, the volume of fuel in wings 102, a loading of the aircraft 100, the flight path of aircraft 100, and the like. The aeroelasticity measurement system 101 within aircraft 100, and described herein, is installed in aircraft 100 to provide in-flight wing twist and deflection data to flight control system 200. The example aeroelasticity measurement system shown in FIG. 1 generally includes a processing unit 106, a reference navigation IMU 108 coupled to processing unit 106, a plurality of measurement navigation IMUs 110 coupled to processing unit 106, and a GPS receiver 112 coupled to processing unit 106. A practical embodiment may include any number of measurement navigation units 110 located throughout aircraft 100, and the location of such measurement navigation units 110 need not be restricted to wings 102.

Processing unit 106 functions as a centralized data collection point and an integrated data processing component for the aeroelasticity measurement system 101. Briefly, processing unit 106 is suitably configured to collect navigation data from reference navigation unit 108 and from measurement navigation units 110, compute a reference navigation solution, compute measurement navigation solutions, and resolve wing twist and/or wing deflection from the navigation solutions, in a centralized and real-time manner that need not require post processing of the navigation data. In practice, processing unit 106 may be realized as a general purpose computing device, such as a personal computer having sufficient memory capacity, processing power and speed, hard drive storage space, user interface devices, and graphics capabilities. Processing unit 106 may utilize a laptop computer and/or any portable computing device that can be conveniently installed in, and removed from, aircraft 100. Alternatively, and more applicable to the embodiments described herein, processing unit 106 may be incorporated into an aircraft-mounted computing device or processing system of aircraft 100, with unit 106's specifications selected in accordance with those of an operational aircraft subsystem.

Reference navigation unit 108 is coupled to processing unit 106 via any suitable data connection. In various embodiments, reference navigation unit 108 is coupled to processing unit 106 via a serial data connection (such as an RS-422 compliant connection) or the two are coupled together via any one of a number of avionics busses. In operation, reference navigation unit 108 generates reference navigation data for a reference location on aircraft 100. In the example embodiment, where wing twist and deflection is measured, reference navigation unit 108 is mounted in body 104 of aircraft 100 and is treated as a fixed reference point. In other words, the reference location corresponding to the reference navigation data is a location in body 104. When deployed, reference navigation unit 108 is mounted in a suitable manner such that its housing does not move relative to the reference point of aircraft 100. In other words, reference navigation unit 108 facilitates "strapdown" navigation (in contrast to a navigation component mounted to a gimbal).

In one practical embodiment, the reference navigation data includes measured angle change and measured velocity change for a plurality of axes. In particular, reference navigation unit 108 may be realized as an IMU having three orthogonal axes corresponding to three sensitive directions. An example IMU employs a combination of gyros and accelerometers to measure angle and velocity change over an interval of time (usually 10 milliseconds or less) termed a "frame". Typically, an IMU provides three-axis measurements taken from an orthogonal triad of gyros measuring angle change and accelerometers measuring velocity change over each frame interval. This is accomplished by sampling the inertial instruments at a designated rate (for example, 1000 Hz or higher) and applying compensations for non-commutativity to accumulate and provide the data at a lower rate. Non-commutativity refers to the fact that the order of the angle and velocity change is not commutative and also not known over the interval of measurement. In practice, the aeroelasticity measurement and control system may utilize any suitable IMU technology, including the aircraft's production inertial navigation system if so desired, and the specific operation of IMUs will not be described in detail herein.

Using IMU technologies, therefore, reference navigation unit 108 is capable of measuring movement and velocity of the reference location relative to the three axes. Reference navigation unit 108 may sample or obtain the reference navigation data at a specified rate, and processing unit 106 may receive the sampled reference navigation data at the same rate. For example, reference navigation unit 108 may be configured to read the reference navigation data at a rate of 100 Hz.

If reference navigation unit 108 is realized as a practical IMU, then the accuracy of the navigation data may drift over time (even though the IMU is very accurate over short periods of time). In contrast, the accuracy of GPS data does not drift over time, however, each individual GPS reading may not be very precise. The aeroelasticity measurement system 101 takes advantage of the long term stability of GPS systems and utilizes GPS data to improve the accuracy of the reference navigation solution and the reference trajectory derived from the reference navigation data. As depicted in FIG. 1, GPS receiver 112 may be coupled to processing unit 106 using a suitable interface, such as an RS-422 serial data connection or an avionics bus connection. In the example embodiment, GPS receiver 112 is configured to provide GPS data for the reference location. Consequently, the antenna for GPS receiver 112 is preferably located near to reference navigation unit 108. In practical embodiments, GPS receiver 112 can be a civilian grade commercial GPS receiver having access to WAAS correction data or other means of enhancing the receiver solution; or it may rely on the standalone receiver solution alone. The GPS WAAS, Wide Area Augmentation System, is a satellite-based system augmenting normal GPS receiver performance with improved information on tropospheric and ionospheric delays, satellite ephemeris and clock errors and the like, such that these errors can be removed from the GPS solution provided by the receiver. Any GPS augmentation system providing WAAS-like advantages can be used, and commercially available systems that can be used to obtain equivalent or better differential GPS performance levels are known.

Processing unit 106 receives the GPS data from GPS receiver 112, along with the reference navigation data from reference navigation unit 108, and processes the GPS data and the reference navigation data in an appropriate manner to generate a reference navigation solution that includes accurate position, velocity, and attitude data for the reference location. In this regard, processing unit 106 generates the reference navigation solution based upon the reference navigation data and based upon the GPS data. In practice, processing unit 106 generates reference navigation solutions at the same rate at which the reference navigation data is sampled (100 Hz in this example). Both measurement and reference navigation solutions are integrated over time, according to the frames of IMU data received. There is a navigation solution for each new frame of IMU data; the integration of these data frames according to strapdown navigation techniques results in a new navigation solution current at the time of validity of the latest frame of data.

Reference navigation unit 108, GPS receiver 112, and processing unit 106 function as a reference system for the aeroelasticity measurement system 101, where the reference system 101 obtains a reference trajectory that tracks the reference location during flight. Ultimately, wing twist and wing deflection is measured relative to the reference trajectory, which represents the position, velocity, and attitude of reference navigation unit 108 over time. Processing unit 106 receives the raw reference navigation data from reference navigation unit 108, and integrates the reference navigation data to generate the reference navigation solution. The GPS data is used to keep the reference trajectory accurate. In the example embodiment, the reference navigation solution is generated using a Kalman filter algorithm to estimate the best state of the navigation system based on both inertial and GPS data. The inertial data is accurate over the short term, while the GPS data is reliably accurate (but noisy) over the long term and does not provide attitude data. The Kalman filter takes measurements from both sources and produces the best estimate of the navigation state. In alternate implementations, the reference navigation state, rather than being a blended GPS/inertial solution as described in the example embodiment, is a pure inertial or GPS solution or a solution derived from any suitable form of navigation aiding.

Each measurement navigation unit 110 is coupled to processing unit 106 via any suitable data connection. In the example embodiment, each measurement navigation unit 110 is coupled to processing unit 106 via a serial data connection (such as an RS-422 compliant connection) or via an avionics bus. In operation, each measurement navigation unit 110 generates measurement navigation data for a measurement location on aircraft 100. In the example embodiment where wing twist and deflection is measured, each measurement navigation unit 110 is mounted in the wings 102 of aircraft 100. For example, each measurement navigation unit 110 may be installed in a pocket or other suitable location within the interior space of the wings 102. Each measurement navigation unit 110 is mounted in a suitable manner such that its housing does not move relative to the respective measurement point of aircraft 100. In other words, the measurement navigation units 110 facilitate, in one embodiment, "strapdown" navigation for the aeroelasticity measurement system 101.

In the example embodiment, the measurement navigation data includes measured angle change and measured velocity change for a plurality of axes. In particular, each measurement navigation unit 110 may be realized as an IMU resolving its inertial measurements to three orthogonal axes. The IMU hardware utilized for measurement navigation units 110 may be of the same type as the IMU hardware utilized for reference navigation unit 108 (described above). Each measurement navigation unit 110 is capable of measuring movement and velocity of its respective measurement location relative to the three axes. Each measurement navigation unit 110 may sample or obtain its measurement navigation data at a specified rate, and processing unit 106 may receive the sampled measurement navigation data at the same rate. For example, each measurement navigation unit 110 may be configured to read the measurement navigation data at a rate of 100 Hz. In a practical embodiment, the IMU samples its inertial instruments to obtain data on angle and velocity change of the unit over an interval of time that is then reported out to the navigator (reference or measurement unit). The processing unit implements the reference and measurement navigators in its computer code and collects the frames of IMU data as they become available.

Processing unit 106 is suitably configured to obtain the measurement navigation data from measurement navigation units 110 and to generate measurement navigation solutions for the respective measurement locations. Each measurement navigation solution is based upon the measurement navigation data for the particular measurement location, and each measurement navigation solution includes position, velocity, and attitude information for the respective measurement location. Thus, the example shown in FIG. 1 generates six measurement navigation solutions—one for each wing-mounted measurement IMU. The generation of the measurement navigation solutions is similar to the generation of the reference navigation solution described above in connection with the reference system. In practice, processing unit 106 generates measurement navigation solutions at the same rate at which the measurement navigation data is sampled (100 Hz in this example). Again, the difference between the reference and measurement navigators is that the reference navigator keeps itself stable and accurate using GPS measurements while the measurement navigator keeps itself stable and accurate using the reference navigation state. The measurement navigator and Kalman filter processing serves to keep the measurement navigator aligned to the reference and estimate the current difference (attitude and flexure) between the two. In other words, based on the navigation solutions for the reference IMU 108 and the navigation solutions for the various measurement navigation units 110, a positional change between the two can be determined, which is indicative of a flexure or twist of the aircraft wing 102.

More specifically, processing unit 106 is also configured to derive a corrected measurement solution from the reference navigation solution and the measurement navigation solutions. The corrected measurement solution indicates aeroelasticity of the measurement locations relative to the reference location. In the example embodiment described herein, processing unit 106 performs stochastic alignment and flexure estimation (in this case through a Kalman filter mechanism) on the reference navigation solution and the measurement navigation solutions to obtain the corrected measurement solution. In practice, the corrected measurement solution represents the best estimate of the navigation state at the measurement IMU 110. The measurement Kalman filter estimates the attitude and flexure between the two, allowing the measurement unit to update itself (correct its drift) based on the reference solution. This corresponds to the wing twist and flexure estimate, and is the means by which the measurement navigation solution is related to the reference solution. Processing unit 106 may be configured to generate the corrected measurement solution at a rate that differs from the data sampling rate. The corrected measurement solution and the aeroelasticity estimate may be generated at a rate that is less than the IMU data sampling rate (generated at 10 Hz in the example embodiment where the navigation data is sampled at 100 Hz).

Furthermore, processing unit 106 may be configured to resolve wing twist and/or wing deflection from the mechanism of a GPS aided inertial solution, in which case alignment and flexure are not estimated and as a result the twist is a direct measurement between reference and measurement navigation solutions.

The measurement navigation solution can be derived from a "stochastic alignment and flexure algorithm" commonly called a transfer alignment filter, or it can be derived from a GPS/inertial Kalman filter solution as described herein. In the GPS/inertial Kalman filter solution case, the measurement solution is independent of the reference solution (aided only by GPS) while in the former case the solution depends on the reference (aided by the reference navigation solution, which provides a direct attitude measurement).

In one practical example, a wing configured for active control could include GPS antennas at the measurement locations, but on the wing surface. In the described measurement system, twist can be measured using a GPS/inertial Kalman filter, but the GPS antenna on the aircraft body is used as well as a computed lever arm between each IMU and the GPS antenna.

GPS antennas in the surface measurement locations of the wing could also be processed to derive an attitude measurement, which would most likely augment, rather than eliminate, the use of inertial measurement units (because of GPS reliability issues, e.g. line of sight required, signal dropouts occur during maneuvers rotating the antennas out of satellite view, etc.).

In a practical deployment, the wing twist and/or wing deflection information can be provided to the flight control system 150 of FIG. 2 in any suitable electronic format via TCP/IP, ARINC 429, via an avionics bus, or via another network protocol.

As mentioned above, FIG. 2 is a schematic representation of a flight control system 150 suitable for use with the aeroelasticity measurement system 101 described above to control and operate one or more actuators to adjust and change a drag associated with the aircraft wing based on wing configuration and/or overall shape. As mentioned above, flight control system 150 receives data from the processing unit 106 of system 101 that relates to positional changes indicative of a flexure or twist of the aircraft wing 102. The processing unit 106 provides such data to a controller 152 of the flight control system 150. The controller 152 is operable to control a position of leading edge flaps 160 and 162 of wing 102 via control of actuators 164 and 166 respectively. Additionally, the controller 152 is operable to control a position of trailing edge flaps 170, 172, and 174 of wing 102 via control of actuators 176, 178, and 180 respectively. A series of actuators 190, 192, 194, and 196 are housed within the wings 102 and are operable based on commands received from controller 152. The actuators 190, 192, 194, and 196, in one embodiment are lift surface actuators mechanically coupled to a skin/structure associated with the wing and operate to apply and remove mechanical stress from the skin/structure of the wing 102, changing a shape of the wing 102, based on the measured flight conditions received from processing unit 106. The illustrated embodiment is but one example, and those skilled in the art will appreciate that multiple leading and trailing edge configurations exist, and that multiple configurations of the corresponding actuators will therefore exist, as well as the lift surface actuators mechanically coupled to the wing structure itself (rather than a flight control surface), or any control or lift surface of the aircraft (and not just those on the wing).

More specifically, based on commands received from processing unit 106, controller 152 is operable to send commands to the various actuators described herein which operate to change one or more of a twist, an orientation, and an overall shape of the wings 102 to increase efficiency for the conditions currently being encountered by the aircraft 100. In one simple example, as aircraft fuel is generally stored within the wings 102, and as a flight progresses, the fuel is gradually removed from the wings 102. The removal of the fuel obviously reduces the weight of the wings 102, affecting their flexure, elasticity and overall orientation with respect to the aircraft body 104. The processing unit 106 is able to quantify these changes via changes in position of the measurement navigation units 110 with respect to the reference IMU 108.

The processing unit 106, in one embodiment, provides these positional changes directly to controller 152, which in turn uses the raw data to calculate adjustments to be made to the wings 102, via operation of one or more of the various actuators described above. In an alternative embodiment, the processing unit 106 uses the positional change data and is programmed to generate commands for changes in position of the various actuators that are sent to the processing device 150, which forwards the commands on to the actuators.

In one embodiment the processing unit 106 collects measurements of body bending, and the flight control system may use these in addition to wing twist data, to control a combination of flight control surfaces on the aircraft, not limited to the wing, for the purpose of obtaining a lower overall aircraft drag.

Figure 3:
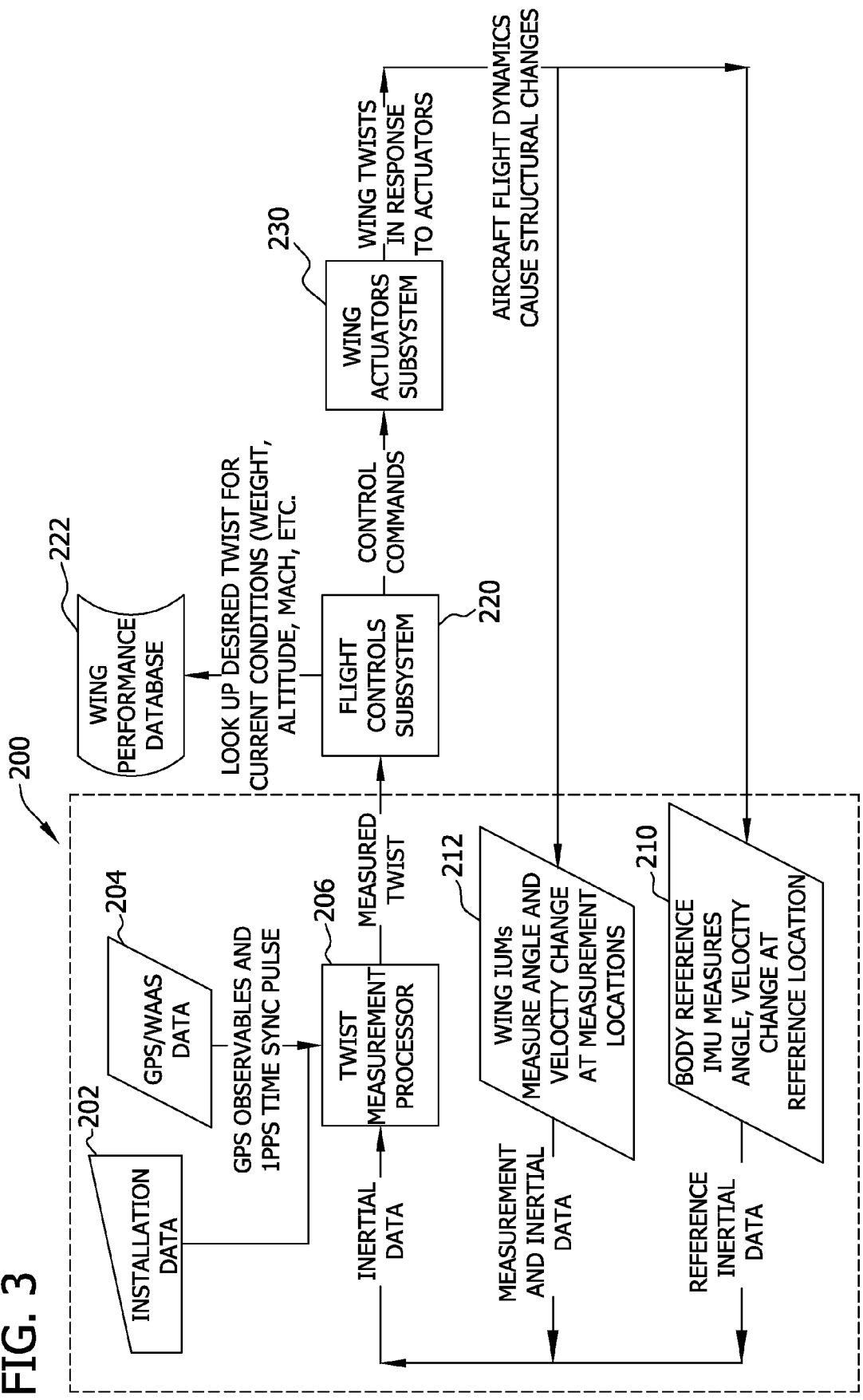
FIG. 3 is a functional diagram of the active wing control system of FIGS. 1 and 2.

FIG. 3 is a functional diagram 200 of the active wing control system described herein that uses real time twist measurements, based on the reference and wing mounted inertial units, in the active control of wing orientation and configuration. Referring to diagram 200, installation data 202 includes inertial measurement unit orientation and wing chord line transformations together with an estimated accuracy determined, for example, during the installation process. Both the installation data 202 and GPS/WAAS Data 204 are provided to a twist measurement processor 206 that is located, as described above, in either of the processing unit 106 or the controller 152. The twist measurement processor 206 also receives reference inertial data from the body reference IMU 210 and measurement inertial data from the wing mounted IMUs 212. The body reference IMU 210, in one embodiment, is an independent unit located in the aircraft body at a selected wing box reference point. In another embodiment, the body reference IMU 210 is the existing earth reference for the aircraft 100 (e.g., the aircraft's inertial navigation system).

The wing IMUs 212 (110 in FIG. 1) are installed at measurement points, for example, that are selected as a function of designed-to wing twist. For example, these wing IMUs, in one embodiment, are oriented to the aircraft body frame within a predefined accuracy. Typically the desired measurement points are in the wing, but one or more may be located in the body to provide data on body flexure.

Based on the inertial data from IMUs 210 and 212, installation data 202, and GPS/WAAS data 204, the twist processor 206 determines the measured wing twist which is forwarded to a flight controls subsystem 220 (e.g., controller 152 in FIG. 2). The flight controls subsystem 220 accepts airspeed data (mach number), altitude, weight, and other parameters from various aircraft avionics as is well known. In one embodiment, the flight controls subsystem is also configured to look up the desired wing twist for a given set of conditions (airspeed, altitude, weight) from a wing performance database 222.

Based on the current conditions, and the desired twist from the database 22, the flight controls subsystem 220 issues control commands to a subsystem of wing actuators 230. Wing twist, as mentioned elsewhere herein, is controllable through existing control surfaces as well as by actuators that press against and pull on a skin of the aircraft wing. Whether one or both of actuators and control surfaces are used, the wing 102 twists in response to the commands processed by flight controls subsystem 220, and a corresponding change in the flight dynamics of the aircraft 100 will result, causing further structural changes to the wing 102 and resulting in the processing of the next set of inertial measurements from body reference IMU 210 and wing IMUs 212.

In alternative embodiments, instead of, or in addition to measurement and adjustment of wing twist, the above described active wing control system may include an aeroelasticity measurement system configured to provide data relating to aircraft body bending. A control system receiving this body bending data can be configured to utilize this data to adjust twist and bending of the aircraft body, through for example, the use of actuators mounted within the aircraft. With such a system the aircraft body may be bent and twisted to desired positions (providing lower drag). Such a system may utilize any existing flight control surface of the vehicle that may be appropriate, in addition to or in absence of actuators for active wing control. To summarize, it is possible to adjust wing twist and body bending using existing flight control surfaces, and a wing designed specifically for active control via actuators may or may not be used. Furthermore, body bending data in addition to wing twist may be utilized, and control surfaces not on the wing may be employed to obtain the desired performance improvement. This body bending data is obtained by the aeroelasticity measurement system from inertial sensors at desired locations in the aircraft body.

Thus the method and system described herein differs from other instances of active wing control and the like insofar as it is directed at achieving a performance benefit in terms of fuel efficiency rather than stability, and it uses real time measurements of the aircraft structures, wing and body, to control available lift surfaces and drive the aircraft shape to a lower drag configuration. The described embodiments may incorporate the aeroelasticity measurement system described in commonly owned U.S. Pat. No. 7,307,585, which is incorporated by reference in its entirety, in conjunction with a wing that may be specifically designed for such active control. One example of an actuator that is compatible with the methods and systems described herein is described in U.S. Patent Application Pub. No.: US2005/022619, which is also incorporated by reference.

The described embodiments utilize real time wing twist data as an input to a flight control system which then controls a position of existing flight control surfaces of a wing and/or actuators within the wing that are capable of flexing the wing to adjust drag in flight, making possible levels of aircraft performance not heretofore achieved, as a result of lower drag. More specifically, an integrated aeroelasticity measurement system and flight control system is described that is utilized as an operational aircraft subsystem, and which accepts real time wing twist measurements. The integrated aeroelasticity measurement system and flight control system generates control signals for existing flight control surfaces or actuators applying active real time control to a wing, thereby reducing and optimizing the drag for the immediate flight conditions.

In one embodiment, a wing is configured to include actuators for active twist control, specifically, the aircraft wing that can be flexed (twisted) during flight using the actuators with the result of optimizing the wing drag for the current flight conditions.

The described embodiments are of use to any aircraft manufacturer designing modern airframes and seeking to improve fuel efficiency performance. Real time measurement of twist and bending coupled with an ability to achieve active wing control based on these measurements, improves aircraft performance beyond that currently achievable. Increasingly, flexible modern airframes result from the use of composites in airframes. In addition, a need for better fuel performance is satisfied as a result of the lower drag that is obtainable through use of any combination of control surfaces to twist the structure into a more favorable shape for the current flight conditions, based on real time aeroelasticity measurements.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An active wing and lift surface control system for an aircraft comprising:
   an aeroelasticity measurement system configured to provide at least one of real time wing twist measurements and real time measurements of aircraft body bending;
   at least one actuator comprising at least one lift surface actuator mechanically coupled against a skin of the aircraft and configured to pull on the skin; and
   a control system communicatively coupled to said aeroelasticity measurement system and to said at least one actuator, said control system operable to receive the measurements from said aeroelasticity measurement system, look up a desired wing twist from a wing performance database based on a given set of flight conditions, and generate control signals, based on the real time measurements and the desired wing twist, to operate said at least one actuator to reduce a drag associated with one or more of the wing and the aircraft body.

2. The active wing and lift surface control system of claim 1 wherein said at least one actuator further comprises at least one flight control actuator configured to control a position of a flight control surface associated with the wing.

3. The active wing and lift surface control system of claim 1 wherein said at least one actuator comprises an actuator configured to control a shape of the wing by changing a position of a portion of a surface of the wing.

4. The active wing and lift surface control system of claim 1 wherein said aeroelasticity measurement system comprises:
   a plurality of measurement navigation units deployed within at least one of the wings and the body of the aircraft; and
   a processing unit communicatively coupled to said measurement navigation units, said processing unit programmed to utilize strapdown navigation techniques to produce wing twist and aircraft body bending measurements relative to reference points on the aircraft.

5. The active wing and lift surface control system of claim 4 wherein said aeroelasticity measurement system comprises a reference navigation unit mounted in the aircraft, communicatively coupled to said, operable to provide a reference point against which a position of said measurement navigation units is determined.

6. The active wing and lift surface control system of claim 5 wherein said reference navigation unit and said measurement navigation units comprise inertial measurement units.

7. The active wing and lift surface control system of claim 4 wherein said processing unit comprises a twist measurement processor configured to receive reference inertial data from said reference navigation unit and measurement inertial data from said measurement navigation units, said twist measurement processor configured to determine at least one of a measured wing twist and a measured aircraft body bending based on the inertial data, the installation data stored in said processing unit, and GPS/WAAS data.

8. The active wing and lift surface control system of claim 7 wherein the installation data comprises an orientation of the reference navigation unit with respect to a desired aircraft body reference point, wing chord line transformations for wing measurement units, and an estimated accuracy.

9. The active wing and lift surface control system of claim 7 wherein said control system is configured to:
   look up a desired wing twist based on airspeed data, altitude, and weight.

10. A method for increasing aircraft performance comprising:
   receiving at least one of real-time wing twist measurements and real-time measurements of aircraft body bending from an aeroelasticity measurement system;
   looking up at least one of a desired flight control surface position and a desired lift surface position from a wing performance database based on a given set of current flight conditions; and operating, based on the at least one of a desired flight control surface position and the desired lift surface position and the at least one of real-time wing twist measurements and real-time measurements of aircraft body bending, a plurality of actuators mechanically coupled to the aircraft to reduce a drag associated with the aircraft and achieve at least one of the desired flight control surface position and the desired lift surface position, wherein the plurality of actuators include at least one lift surface actuator mechanically coupled against a skin of the aircraft and configured to pull on the skin.

11. A method according to claim 10 wherein the desired flight control surface position is a wing twist configuration.

12. A method according to claim 10 wherein receiving at least one of real-time wing twist measurements and real-time measurements of aircraft body bending from an aeroelasticity measurement system comprises:
   receiving inertial measurements from a plurality of inertial measurement units dispersed about the aircraft;
   comparing the inertial measurements with measurements from a reference inertial measurement unit to determine changes in position of the inertial measurement units from a previous position; and
   determining a flight control surface configuration based on the changes in position of the inertial measurement units.

13. A method according to claim 12 wherein the changes in position are determined based on installation data for both the reference inertial measurement unit and the inertial measurement units.

14. A method according to claim 10 wherein the given set of current flight conditions includes airspeed data, altitude, and weight.

15. A method according to claim 14 wherein the desired flight control surface position is a desired wing twist.

16. A method according to claim 10 wherein operating a plurality of actuators mechanically coupled to the aircraft comprises generating control signals that cause the actuators to adjust a shape of the aircraft to obtain a lower drag and an increase in performance.

17. A flight control system comprising:
   at least one lift surface actuator mechanically coupled against a skin of an aircraft and configured to pull on the skin; and
   a processor configured to receive wing twist measurements from an external source, configured to look up a desired wing twist from a wing performance database based on a given set of flight conditions, and programmed to generate control signals, based on the wing twist measurements and the desired wing twist, to operate said at least one actuator to reduce a drag associated with the lift surface.

18. The flight control system of claim 17 further comprising at least one of:
   at least one actuator configured to control a position of a flight control surface associated with the wing; and
   at least one actuator configured to control a shape of the wing by changing a position of a portion of a surface of the wing.

19. The flight control system of claim 17 wherein said flight control system is configured to:
   utilize airspeed data, altitude, and weight, to determine the desired wing twist, based on data tables within the wing performance database; and
   operate said at least one lift surface actuator to achieve the desired wing twist.

20. The flight control system of claim 17 further comprising:
   a GPS system comprising a plurality of GPS antennas; and
   a plurality of inertial measurement units, said GPS system and said plurality of inertial measurement units providing a portion of the data for determination of the wing twist measurements, respective said GPS antennas mounted proximate respective inertial measurement units and flush with the lift surface.

21. The flight control system of claim 20 further comprising an inertial navigation system configured to provide a reference for said plurality of inertial measurement units.

* * * * *